United States Patent
Källkvist et al.

(10) Patent No.: US 11,111,837 B2
(45) Date of Patent: Sep. 7, 2021

(54) SYSTEM AND A METHOD FOR ADAPTING CONTROL OF A REDUCING AGENT DOSING UNIT

(71) Applicant: Scania CV AB, Södertälje (SE)

(72) Inventors: Kurt Källkvist, Strängnäs (SE);
Emanuel Remmo, Södertälje (SE);
Joakim Sommansson, Grödinge (SE)

(73) Assignee: Scania CV AB, Södertälje (SE)

( * ) Notice: Subject to any disclaimer, the term of this patent is extended or adjusted under 35 U.S.C. 154(b) by 0 days.

(21) Appl. No.: 16/646,605

(22) PCT Filed: Sep. 6, 2018

(86) PCT No.: PCT/SE2018/050891
§ 371 (c)(1),
(2) Date: Mar. 12, 2020

(87) PCT Pub. No.: WO2019/059824
PCT Pub. Date: Mar. 28, 2019

(65) Prior Publication Data
US 2020/0208558 A1 Jul. 2, 2020

(30) Foreign Application Priority Data
Sep. 22, 2017 (SE) .................................. 1751177-5

(51) Int. Cl.
*F01N 3/20* (2006.01)

(52) U.S. Cl.
CPC ........... *F01N 3/208* (2013.01); *F01N 3/2066* (2013.01); *F01N 2610/02* (2013.01);
(Continued)

(58) Field of Classification Search
CPC ........ F01N 3/2066; F01N 3/208; F01N 9/007; F01N 2560/08; F01N 2610/02;
(Continued)

(56) References Cited

U.S. PATENT DOCUMENTS

2003/0140898 A1   7/2003   Xu
2009/0077949 A1   3/2009   Kleinknecht
(Continued)

FOREIGN PATENT DOCUMENTS

DE   102016102169 A1   10/2017

OTHER PUBLICATIONS

Scania CV AB, International Application No. PCT/SE2018/050891, International Preliminary Report on Patentability, dated Mar. 24, 2020.
(Continued)

*Primary Examiner* — Audrey K Bradley
(74) *Attorney, Agent, or Firm* — Moore & Van Allen PLLC; W. Kevin Ransom

(57) ABSTRACT

Disclosed is a method for adapting control of a reducing agent dosing unit in a reducing agent provision system for emission control of a combustion engine. Characteristics relating to pressure variations associated with a dosing cycle are used for determining a first time period and a second time period. The time periods relate to a delay between activation of dosing and de-activation of dosing, respectively. The first time period and second time period are used for adapting operation of said reducing agent dosing unit.

17 Claims, 5 Drawing Sheets

(52) U.S. Cl.
CPC .............. *F01N 2610/146* (2013.01); *F01N 2610/1433* (2013.01); *F01N 2900/1808* (2013.01); *F01N 2900/1811* (2013.01); *F01N 2900/1821* (2013.01)

(58) Field of Classification Search
CPC ....... F01N 2610/1433; F01N 2610/146; F01N 2900/1808; F01N 2900/1811
See application file for complete search history.

(56) References Cited

U.S. PATENT DOCUMENTS

| | | | |
|---|---|---|---|
| 2009/0159132 A1 | 6/2009 | Gerlach | |
| 2009/0282815 A1 | 11/2009 | Reinhold et al. | |
| 2010/0139254 A1* | 6/2010 | Sebestyen | F01N 11/00 60/286 |
| 2010/0257842 A1 | 10/2010 | Bauer et al. | |
| 2011/0107742 A1* | 5/2011 | Igarashi | F01N 3/208 60/277 |
| 2012/0296551 A1 | 11/2012 | Kabasin | |
| 2013/0226488 A1 | 8/2013 | Wirkowski et al. | |
| 2014/0165539 A1 | 6/2014 | Nagata | |
| 2015/0114099 A1 | 4/2015 | Qiao et al. | |
| 2015/0377176 A1 | 12/2015 | Hatanaka et al. | |
| 2019/0293189 A1* | 9/2019 | Venekamp | F16K 7/14 |

OTHER PUBLICATIONS

Scania CV AB, International Application No. PCT/SE2018/050891, International Search Report, dated Oct. 31, 2018.
Scania CV AB, International Application No. PCT/SE2018/050891, Written Opinion, dated Oct. 31, 2018.

* cited by examiner

SYSTEM AND A METHOD FOR ADAPTING CONTROL OF A REDUCING AGENT DOSING UNIT

CROSS-REFERENCE TO RELATED APPLICATIONS

This application is a national stage application (filed under 35 § U.S.C. 371) of PCT/SE2018/050891, filed Sep. 6, 2018 of the same title, which, in turn, claims priority to Swedish Application No. 1751177-5 filed Sep. 22, 2017; the contents of each of which are hereby incorporated by reference.

FIELD OF THE INVENTION

The present invention relates to a method for adapting control of a reducing agent dosing unit in a reducing agent provision system for emission control of a combustion engine. The invention relates also to a computer program product comprising program code for a computer for implementing a method according to the invention. It relates also to a system for adapting control of a reducing agent dosing unit in a reducing agent provision system for emission control of a combustion engine and a motor vehicle equipped with the system.

BACKGROUND OF THE INVENTION

Vehicle combustion engine emission control systems are today arranged with catalytic configurations e.g. for conversion of $NO_x$ gas. The catalytic configurations may comprise a DOC-unit (Diesel Oxidation Catalyst), DPF-unit (Diesel Particulate Filter), SCR-unit (Selective Catalytic Reduction) and ammonia slip catalyst. In such a system it is common to provide a reducing agent for reducing a prevailing $NO_x$-content of an exhaust gas of said engine.

A control unit may be arranged to control dosing by means of an electrically controlled valve unit provided in a reducing agent dosing unit. The valve unit is spring biased, whereby the control unit can control a position of the valve unit by applying a voltage to an induction arrangement. Hereby an induction force is overcoming the force applied by the spring and the valve unit can move from a closed state to an open state whereby a pressurized reducing agent is dosed into the engine emission control system.

Due to e.g. inherent characteristics of the dosing unit, operational states including reducing agent temperature, reducing agent viscosity etc., as well as potential wear of the dosing unit, there are time delays of the actual position shifting of the valve unit when said voltage is activated and de-activated. Hereby a non-optimal dosing of reducing agent may take place. It is important to control the dosing unit in such a way that the actual dosed amount of reducing agent corresponds to the intended dosed amount of reducing agent for each dosing cycle.

US20130226488 relates to a method and device for detecting when a closing point of a hydraulic valve has been reached.

SUMMARY OF THE INVENTION

An object of the present invention is to propose a novel and advantageous method for adapting control of a reducing agent dosing unit in a reducing agent provision system for emission control of a combustion engine.

Another object of the invention is to propose a novel and advantageous system and a novel and advantageous computer program for adapting control of a reducing agent dosing unit in a reducing agent provision system for emission control of a combustion engine.

Another object of the present invention is to propose a novel and advantageous method providing a cost effective and reliable adaptation of control of a reducing agent dosing unit in a reducing agent provision system for emission control of a combustion engine.

Another object of the invention is to propose a novel and advantageous system and a novel and advantageous computer program providing a cost effective and reliable adaptation of control of a reducing agent dosing unit in a reducing agent provision system for emission control of a combustion engine.

Yet another object of the invention is to propose a method, a system and a computer program achieving a robust, accurate and automated adaption of control of a reducing agent dosing unit in a reducing agent provision system for emission control of a combustion engine.

Yet another object of the invention is to propose an alternative method, an alternative system and an alternative computer program for adapting control of a reducing agent dosing unit in a reducing agent provision system for emission control of a combustion engine.

Some of these objects are achieved with a method according to claim 1. Other objects are achieved with a system in accordance with what is depicted herein. Advantageous embodiments are depicted in the dependent claims. Substantially the same advantages of method steps of the innovative method hold true for corresponding means of the innovative system.

According to an aspect of the invention there is provided a method for adapting control of a reducing agent dosing unit in a reducing agent provision system for emission control of a combustion engine, said reducing agent provision system comprising a pump unit for pressurizing said reducing agent to be dosed, wherein said dosing unit comprising an electrically controlled valve unit arranged to be shifted between an opened state and a closed state, comprising the steps of:
- continuously determining a prevailing pressure of said reducing agent in said reducing agent provision system downstream of said pump unit;
- initiate shifting said valve unit at a first point of time to said open state from said closed state by applying a voltage to a valve unit operation arrangement;
- determining a second point of time for a characteristic pressure drop due to said shifting to said open state of said valve unit;
- initiate shifting said valve unit at a third point of time to said closed state from said open state by turning off said voltage to said valve unit operation arrangement;
- determining a fourth point of time for a characteristic pressure increase due to said shifting to said closed state of said valve unit;
- determining a time interval between said first and said second point of time and another time interval between said third and fourth point of time; and
- providing the thus determined time intervals as a basis for said adaption control of said reduction agent dosing unit for obtaining an intended dosing period during a dosing cycle.

Hereby a high dosing accuracy is advantageously achieved while eliminating time demanding calibration of the reducing agent dosing unit operation.

Said electrically controlled valve unit may be a spring biased magnetic valve unit.

The method may comprise the steps of:
continuously determining a prevailing current applied for said valve unit operation arrangement;
determining a fifth point of time for a characteristic current drop due to said shifting to said open state of said valve unit;
comparing the thus determined second point of time with said thus determined fifth point of time to decide whether said second point of time appears reliable.

Hereby a reliable and accurate adaption control of said reduction agent dosing unit is achieved.

The method may comprise the steps of:
continuously determining a prevailing current applied for said valve unit operation arrangement;
determining a sixth point of time for a characteristic current increase due to said shifting to said closed state of said valve unit;
comparing the thus determined fourth point of time with said thus determined sixth point of time to decide whether said fourth point of time appears reliable.

Hereby a reliable and accurate adaption control of said reduction agent dosing unit is achieved.

The method may comprise the step of:
storing said time intervals together with values for prevailing applied voltage, prevailing reducing agent temperature and prevailing pressure of said reducing agent, said values corresponding to a particular system working point.

The method may comprise the step of:
for a number of different system working points, storing corresponding determined pairs of time intervals.

The method may comprise the step of:
providing the thus stored system working point information for adapting control of said reduction agent dosing unit.

The method may comprise the step of:
providing non pre-stored determined time intervals as a basis for consecutive adaption control of said reduction agent dosing unit for obtaining an intended dosing period during a dosing cycle.

According to one embodiment there is provided a system for system for adapting control of a reducing agent dosing unit in a reducing agent provision system for emission control of a combustion engine, said reducing agent provision system comprising a pump unit for pressurizing said reducing agent to be dosed, wherein said dosing unit comprising an electrically controlled valve unit arranged to be shifted between an opened state and a closed state, comprising:
means arranged for continuously determining a prevailing pressure of said reducing agent in said reducing agent provision system downstream of said pump unit;
means arranged for initiating shifting said valve unit at a first point of time to said open state from said closed state by applying a voltage to a valve unit operation arrangement;
means arranged for determining a second point of time for a characteristic pressure drop due to said shifting to said open state of said valve unit;
means arranged for initiating shifting said valve unit at a third point of time to said closed state from said open state by turning off said voltage to said valve unit operation arrangement;
means arranged for determining a fourth point of time for a characteristic pressure increase due to said shifting to said closed state of said valve unit;
means arranged for determining a time interval between said first and said second point of time and another time interval between said third and fourth point of time; and
means arranged for providing the thus determined time intervals as a basis for said adaption control of said reduction agent dosing unit for obtaining an intended dosing period during a dosing cycle.

The system may comprise:
means arranged for continuously determining a prevailing current applied for said valve unit operation arrangement;
means arranged for determining a fifth point of time for a characteristic current drop due to said shifting to said open state of said valve unit;
means arranged for comparing the thus determined second point of time with said thus determined fifth point of time to decide whether said second point of time appears reliable.

The system may comprise:
means arranged for continuously determining a prevailing current applied for said valve unit operation arrangement;
means arranged for determining a sixth point of time for a characteristic current increase due to said shifting to said closed state of said valve unit;
means arranged for comparing the thus determined fourth point of time with said thus determined sixth point of time to decide whether said fourth point of time appears reliable.

The system may comprise:
means arranged for storing said time intervals together with values for prevailing applied voltage, prevailing reducing agent temperature and prevailing pressure of said reducing agent, said values corresponding to a particular system working point.

The system may comprise:
means arranged for, for a number of different system working points, storing corresponding determined pairs of time intervals.

The system may comprise:
means arranged for providing the thus stored system working point information for adapting control of said reduction agent dosing unit.

The system may comprise:
providing non pre-stored determined time intervals as a basis for consecutive adaption control of said reduction agent dosing unit for obtaining an intended dosing period during a dosing cycle.

According to an aspect of the invention there is provided a vehicle comprising a system according to what is presented herein. Said vehicle may be any from among a truck, bus or passenger car. According to an embodiment the system is provided for a marine application or industrial application.

According to an aspect of the invention there is provided a computer program for adapting control of a reducing agent dosing unit in a reducing agent provision system for emission control of a combustion engine, wherein said computer program comprises program code for causing an electronic control unit or a computer connected to the electronic control unit to perform anyone of the method steps depicted herein, when run on said electronic control unit or said computer.

According to an aspect of the invention there is provided a computer program for adapting control of a reducing agent dosing unit in a reducing agent provision system for emission control of a combustion engine, wherein said computer program comprises program code stored on a computer-readable medium for causing an electronic control unit or a computer connected to the electronic control unit to perform anyone of the method steps depicted herein.

According to an aspect of the invention there is provided a computer program for adapting control of a reducing agent dosing unit in a reducing agent provision system for emission control of a combustion engine, wherein said computer program comprises program code stored on a computer-readable medium for causing an electronic control unit or a computer connected to the electronic control unit to perform anyone of the method steps depicted herein, when run on said electronic control unit or said computer.

According to an aspect of the invention there is provided a computer program product containing a program code stored on a computer-readable medium for performing anyone of the method steps depicted herein, when said computer program is run on an electronic control unit or a computer connected to the electronic control unit.

According to an aspect of the invention there is provided a computer program product containing a program code stored non-volatile on a computer-readable medium for performing anyone of the method steps depicted herein, when said computer program is run on an electronic control unit or a computer connected to the electronic control unit.

Further objects, advantages and novel features of the present invention will become apparent to one skilled in the art from the following details, and also by putting the invention into practice. Whereas the invention is described below, it should be noted that it is not confined to the specific details described. One skilled in the art having access to the teachings herein will recognise further applications, modifications and incorporations in other fields, which are within the scope of the invention.

BRIEF DESCRIPTION OF THE DRAWINGS

For fuller understanding of the present invention and its further objects and advantages, the detailed description set out below should be read in conjunction with the accompanying drawings, in which the same reference notations denote similar items in the various diagrams, and in which.

DETAILED DESCRIPTION OF THE INVENTION

Figure 1:
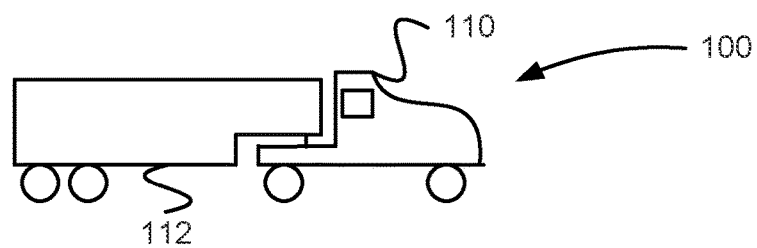
FIG. 1 schematically illustrates a vehicle according to an embodiment of the invention.

FIG. 1 depicts a side view of a vehicle 100. The exemplified vehicle 100 comprises a tractor unit 110 and a trailer 112. The vehicle 100 may be a heavy vehicle, e.g. a truck or a bus. It may alternatively be a car.

It should be noted that the inventive system is applicable to various vehicles, such as e.g. a mining machine, tractor, dumper, wheel-loader, platform comprising an industrial robot, forest machine, earth mover, road construction vehicle, road planner, emergency vehicle or a tracked vehicle.

It should be noted that the invention is suitable for application in various systems comprising a combustion engine and an associated emission control system. The invention is suitable for application in various systems comprising a combustion engine and a catalytic configuration. Said catalytic configuration may comprise at least one SCR-unit. Said catalytic configuration may comprise one or more DOC-units, DPF-units (Diesel Particulate Filter) and SCR-units. It should be noted that the invention is suitable for application in any catalytic configuration and is therefore not confined to catalytic configurations for motor vehicles. The innovative method and the innovative system according to one aspect of the invention are well suited to other platforms which comprise a combustion engine and a catalytic configuration than motor vehicles, e.g. watercraft. The watercraft may be of any kind, e.g. motorboats, steamers, ferries or ships.

The innovative method and the innovative system according to one aspect of the invention are also well suited to, for example, systems which comprise industrial combustion engines and/or combustion engine-powered industrial robots and an associated emission control system comprising a catalytic configuration.

The innovative method and the innovative system according to one aspect of the invention are also well suited to various kinds of power plants, e.g. an electric power plant which comprises a combustion engine-powered generator and an associated emission control system comprising a catalytic configuration.

The innovative method and the innovative system are also well suited to various combustion engine systems comprising a catalytic configuration.

The innovative method and the innovative system are well suited to any engine system which comprises an engine, e.g. on a locomotive or some other platform, an associated emission control system comprising a catalytic configuration.

The innovative method and the innovative system are well suited to any system which comprises a $NO_x$-generator an associated emission control system comprising a catalytic configuration.

The term "link" refers herein to a communication link which may be a physical connection such as an opto-electronic communication line, or a non-physical connection such as a wireless connection, e.g. a radio link or microwave link.

The term "line" refers herein to a passage for holding and conveying a fluid, e.g. a reducing agent in liquid form. The line may be a pipe of any size and be made of any suitable material, e.g. plastic, rubber or metal.

The term "reductant" or "reducing agent" refers herein to an agent used for reacting with certain emissions in an SCR system. These emissions may for example be $NO_x$ gas. The terms "reductant" and "reducing agent" are herein used synonymously. In one version, said reductant is so-called AdBlue. Other kinds of reductants may of course be used. AdBlue is herein cited as an example of a reductant, but one skilled in the art will appreciate that the innovative method and the innovative system are feasible with other types of reductants.

Figure 2A:
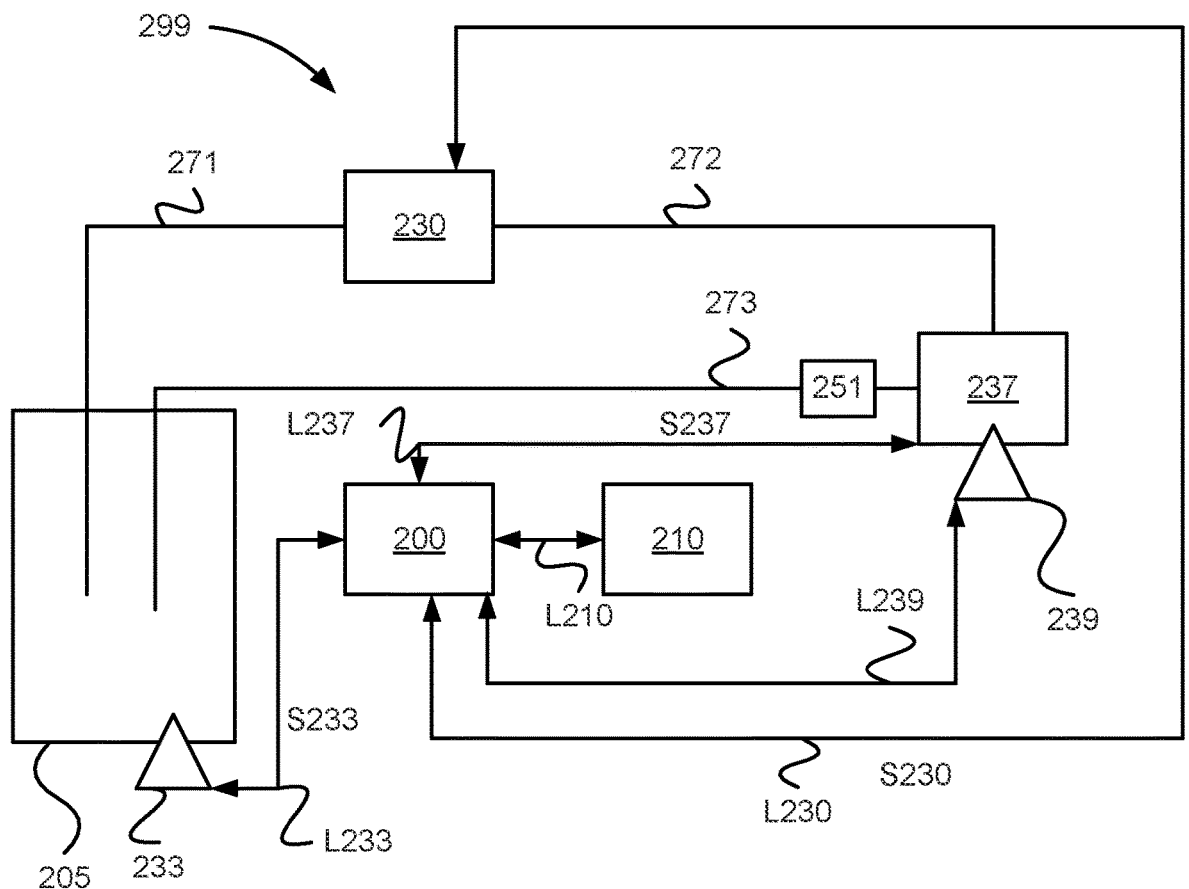
FIG. 2a schematically illustrates a system according to an embodiment of the invention.

FIG. 2a schematically illustrates a system 299 according to an example embodiment of the invention. The system 299 is situated in the tractor unit 110 and may be part of a catalytic configuration, also denoted exhaust gas processing configuration. It comprises in this example a container 205 arranged to hold a reductant. The container 205 is adapted to holding a suitable amount of reductant and also to being replenishable as necessary. The container may be adapted to hold e.g. 75 or 50 litres of reductant.

A first line 271 is provided to lead the reductant to a pump 230 from the container 205. The pump 230 may be any suitable pump. The pump 230 may be arranged to be driven by an electric motor (not depicted). The pump 230 may be adapted to drawing the reductant from the container 205 via the first line 271 and supplying it via a second line 272 to a dosing unit 237. The dosing unit 237 may also be referred to as a reducing agent dosing unit. The dosing unit 237 comprises an electrically controlled dosing valve by means of which a flow of reductant added to the exhaust system can be controlled. The pump 230 is adapted to pressurizing the reductant in the second line 272. A third line 273 is provided with a throttle unit 251, against which said pressure of the reductant may build up in the system 299. Alternatively said throttle unit 251 is provided within said dosing unit 237.

A first control unit 200 is arranged for communication with the pump 230 via a link L230. The first control unit 200 is arranged to send control signals S230 via said link L230. The first control unit 200 is arranged to control operation of said pump 230 so as to for example adjust flows of the reducing agent within the system 299. The first control unit 200 is arranged to control an operation power of the pump 230 e.g. by controlling the electric motor.

The dosing unit 237 is adapted to supplying said reductant to an exhaust gas system (see FIG. 2b) of the vehicle 100. More specifically, it is adapted to supplying a suitable amount of reductant in a controlled way to an exhaust system of the vehicle 100. In this version, one SCR catalyst (see FIG. 2b) is situated downstream of the location in the exhaust system where the supply of reductant takes place. The dosing unit 237 is depicted in greater detail with reference to FIG. 2c.

The third line 273 running between the dosing unit 237 and the container 205 is adapted to leading back to the container 205 a certain amount of the reductant fed to the dosing unit 237. This configuration results in advantageous cooling of the dosing unit 237. The dosing unit 237 is thus cooled by a flow of the reductant when it is pumped through it from the pump 230 to the container 205.

The first control unit 200 is arranged for communication with the dosing unit 237 via a link L237. The first control unit 200 is arranged to send control signals S237 via said link L237. The first control unit 200 is arranged to control operation of said dosing unit 237 so as to for example control dosing of the reducing agent to the exhaust gas system of the vehicle 100. The control unit 200 is arranged to control operation of the dosing unit 237 so as to for example adjust return flow of said reducing agent to the container 205.

A temperature sensor 233 is arranged at said tank 205. Said temperature sensor 233 is arranged to continuously or intermittently measure a prevailing temperature Temp of the reducing agent held in said tank 205. The temperature sensor 233 is arranged for communication with the first control unit 200 via a link L233. The temperature sensor 233 is arranged to send signals S233 comprising information about the prevailing temperature Temp of the reducing agent to the first control unit 200 via the link L233.

A pressure sensor 239 is arranged at said dosing unit 237. Said pressure sensor 239 is arranged to continuously or intermittently measure a prevailing pressure P of the reducing agent in said dosing unit 237. This pressure P of the reducing agent is provided downstream said pump 230 and upstream a valve unit 251. The pressure sensor 239 is arranged for communication with the first control unit 200 via a link L239. The pressure sensor 239 is arranged to send signals S239 comprising information about the prevailing pressure P of the reducing agent to the first control unit 200 via the link L239.

A second control unit 210 is arranged for communication with the first control unit 200 via a link L210. It may be releasably connected to the first control unit 200. It may be a control unit external to the vehicle 100. It may be adapted to performing the innovative steps according to the invention. It may be used to cross-load software to the first control unit 200, particularly software for applying the innovative method. It may alternatively be arranged for communication with the first control unit 200 via an internal network on board the vehicle. It may be adapted to performing functions corresponding to those of the first control unit 200, such as e.g. adapting control of a reducing agent dosing unit in a reducing agent provision system for emission control of a combustion engine, said reducing agent provision system comprising a pump unit for pressurizing said reducing agent to be dosed, wherein said dosing unit comprising an electrically controlled valve unit arranged to be shifted between an opened state and a closed state.

Figure 2B:
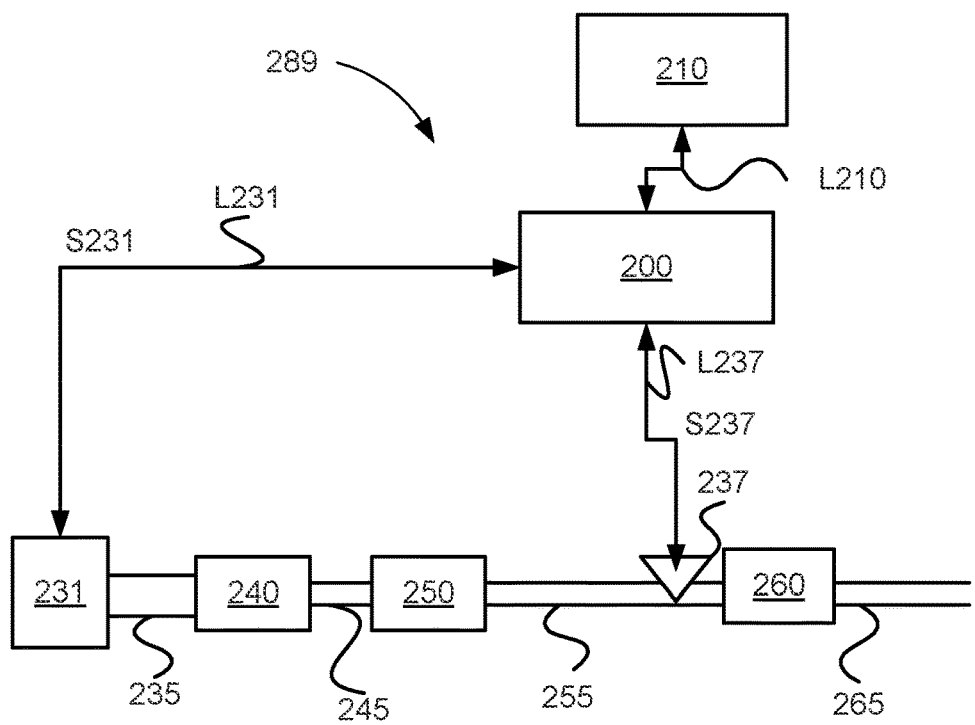
FIG. 2b schematically illustrates a system according to an embodiment of the invention.

FIG. 2b schematically illustrates a system 289 of the vehicle shown i FIG. 1 according to an embodiment of the invention. The system 289 may constitute a part of the inventive system for adapting control of a reducing agent dosing unit in a reducing agent provision system for emission control of a combustion engine 231, said reducing agent provision system comprising a pump unit 230 for pressurizing said reducing agent to be dosed, wherein said dosing unit 237 comprising an electrically controlled valve unit 291 arranged to be shifted between an opened state OS and a closed state CS.

The first control unit 200 is arranged for communication with said combustion engine 231 via a link L231. The first control unit is arranged to control operation of said combustion engine 231 by means of control signals S231.

The combustion engine 231 is during operation causing an exhaust gas flow which is lead via a first passage 235 to a DOC-unit 240. A second passage 245 is arranged to convey said exhaust gas flow from said DOC-unit 240 to a DPF-unit 250. A third passage 255 is arranged to convey said exhaust gas flow from said DPF-unit 250 to an SCR-unit 260. A fourth passage 265 is arranged to convey said exhaust gas flow from said SCR-unit 260 to an environment of the catalytic configuration. The catalytic configuration may comprise any of said components downstream said engine 231, including at least one member presenting catalytic features. The catalytic configuration may comprise any set of said components downstream said engine 231, including at least one member presenting catalytic features being sensitive for sulphur poisoning.

Said dosing unit 237 is arranged to provide said reductant to said third passage 255 upstream of said SCR-unit 260 and downstream of said DPF-unit 250. The first control unit 200 is arranged to control operation of said dosing unit 237 so as to, where applicable, dose reducing agent into the third passage 255.

Said SCR-unit 260 may comprise a vaporizing module (not shown) which is arranged to vaporize said dosed reducing agent so as to achieve a mixture of exhaust gas and reducing agent for treatment by means of an SCR-portion of the SCR-unit 260. Said vaporizing module may comprise a mixer (not shown) for mixing said vaporized reducing agent with the exhaust gas. Said vaporizing module may be formed in any suitable way. Said vaporizing module is configured to achieve a most effective vaporizing of provided reducing agent as possible. Herein said vaporizing module is providing large surfaces where vaporizing of provided reducing agent may be performed in an effective way. Said vaporizing module may consist of a metal or a metal alloy.

Said SCR-unit 260 may according to one possible configuration comprise an ammonia slip catalyst ASC, not illustrated.

Said first control unit 200 is arranged to perform the process steps depicted herein, comprising the process steps which are detailed with reference to FIG. 4*b*.

Figure 2C:
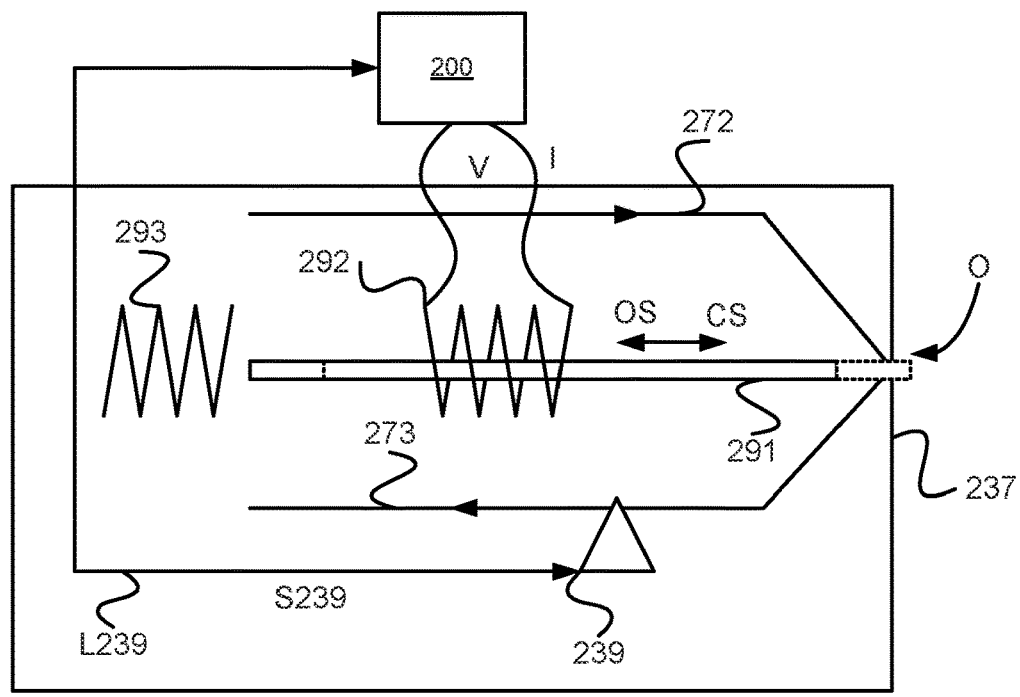
FIG. 2c schematically illustrates a system according to an embodiment of the invention.

FIG. 2*c* schematically illustrates the dosing unit 237 in greater detail. Hereby the second line 272 is arranged to provide pressurized reducing agent to an opening O of the dosing unit 237. The third line 273 is arranged to lead reducing agent which has not been dosed via said opening O back to the tank 205. The pressure sensor 239 is arranged to measure a prevailing pressure P in said third line 273, or alternatively in said second line 272, and communicate measurements by signals S239 via the link L239 to the first control unit 200.

The first control unit 200 is arranged to control dosing by means of an electrically controlled valve unit 291. The valve unit is according to this example an elongated member, like a pin. The valve unit 291 is spring biased by means of a spring 293. The first control unit 200 is arranged to control a position of the valve unit 291 by means of an electrical wiring 292 comprising a coil surrounding the valve unit 291. This is performed by an induction process. By applying a voltage V by means of said first control unit a current I is generated. Hereby an induction force is overcoming the force applied by the spring 293 and the valve unit 291 is moved from a closed state CS to an open state OS. The valve unit 291 is closing said opening O in said closed state, whereby no dosing of reducing agent is performed. Dosing of the pressurized reducing agent is performed when the valve unit is in said open state OS. When the applied voltage V is shut off, the spring 293 will affect the valve unit to move from said open state OS to said closed state CS.

The first control unit 200 is arranged to continuously determine the prevailing current I in said electrical wiring 292. The current I is presenting variations over time due to the induction process.

Figure 3:
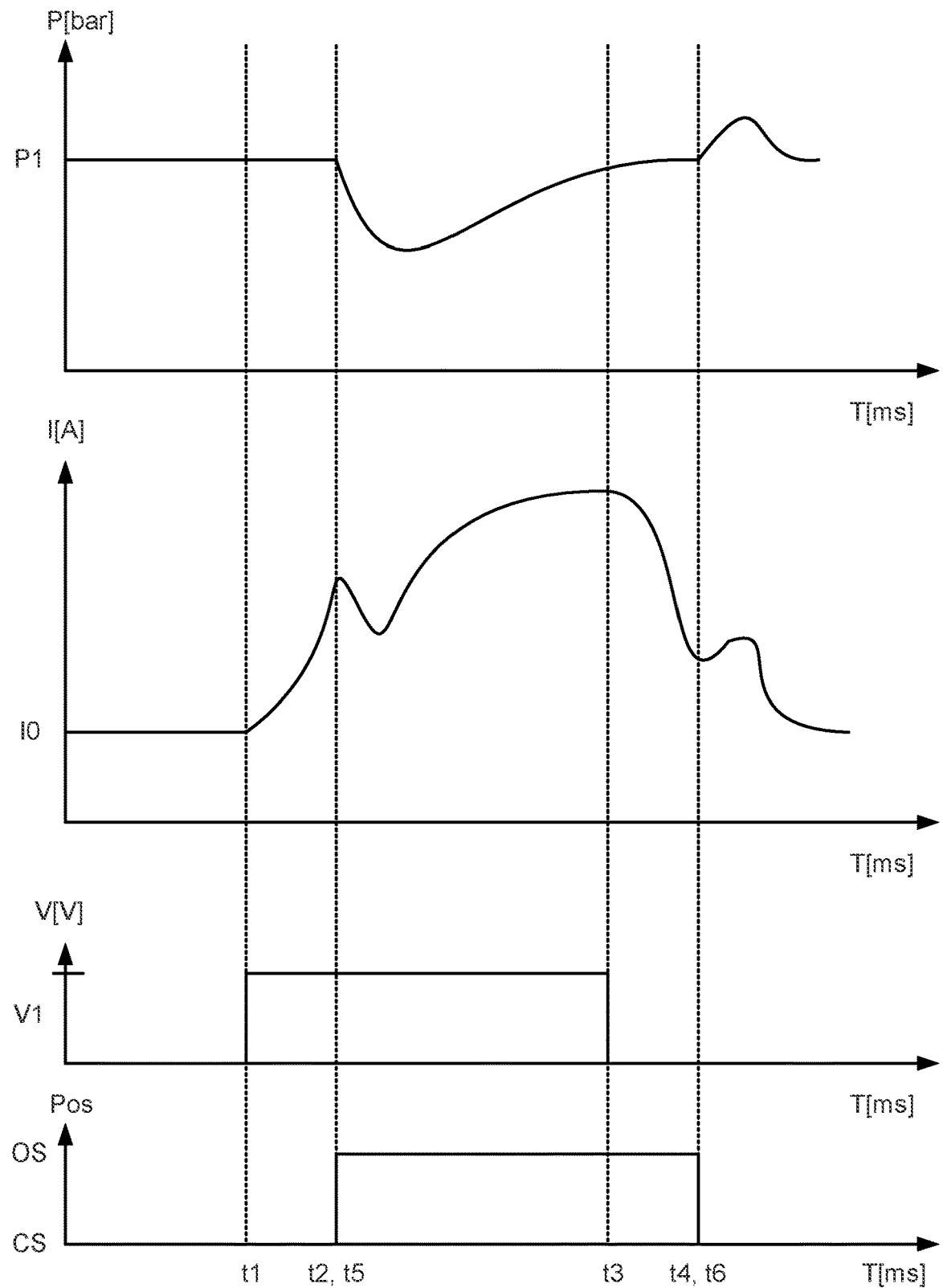
FIG. 3 schematically illustrates a diagram according to an embodiment of the invention.

FIG. 3 schematically illustrates a diagram of various parameters according to an embodiment of the invention. Herein four graphs are presented, namely a first graph relating to a position (state) of the valve unit 291, a second graph relating to applied voltage V to the coil 292, a third graph relating to pressure P of the reducing agent in the dosing unit 237 and a fourth graph relating to a current I in the electrical wiring 292. All parameters are presented as a function of time T given in milliseconds ms.

The voltage V is applied at a first point of time t1. The voltage V is turned off at a third point of time t3. The time period t1-t3 refers to the intended dosing time during which the valve unit 291 is desired to be in the open state OS. However, due to inherent characteristics of the dosing unit 237 the actual time period during which dosing is performed is delayed relative the time period t1-t3.

The graph representing the prevailing current I presents a characteristic form after activating and de-activating the voltage V. This is used according to an embodiment of the invention.

When applying the voltage V at the first point of time t1 the current I increases from zero (I0) to a fifth point of time t5 when the valve unit 291 shifts from the closed state CS to the open state OS. Hereby a temporary decrease of the current I is noticed. The temporary decrease of the current I is detected and the corresponding point of time t5 is detected. After the valve unit 291 has shifted from the closed state CS to the open state OS the current I increases to a certain level until the applied voltage V is de-activated. Then the current I decreases until the valve unit 291 shifts from the open state OS to the closed state CS. Hereby a temporary increase of the current I is noticed. The temporary increase of the current I is detected and the corresponding point of time t6 is detected. After the temporary increase of the current I the current I decreases to a value of 0 Ampere (I0).

The graph representing the prevailing pressure P presents a characteristic form after activating and de-activating the voltage V. This is used according to an embodiment of the invention.

When applying the voltage V at the first point of time t1 the pressure P of the reducing agent remains at a certain level P1 until the valve unit 291 shifts from the closed state CS to the open state OS. Hereby dosing is performed and the pressure drops temporary. The certain level P1 of the reducing agent is dependent on the operation of the pump 230. Said certain level may be e.g. 9 bar. The pressure drop of the reducing agent is detected and a corresponding point of time t2 is detected. After the temporary pressure drop the pressure is built up towards the certain level P1. After the applied voltage V is deactivated and the valve unit 291 eventually shifts from the open state OS to the closed state CS a temporary increase of the pressure is noticed. The temporary pressure increase of the reducing agent is detected and a corresponding point of time t4 is detected According to this example the second point of time t2 and the fifth point of time t5 are substantially the same. This does however not need to be the case. The second point of time t2 and the fifth point of time t5 may differ to some extent. However, it is according to one example performed a test of the reliability of one or the other of the second point of time t2 and the fifth point of time t5. If the time values does not differ more than a certain extent it is determined that the values are reliable.

According to this example the fourth point of time t4 and the sixth point of time t6 are substantially the same. This does however not need to be the case. The fourth point of time t4 and the sixth point of time t6 may differ to some extent. However, it is according to one example performed a test of the reliability of one or the other of the fourth point of time t4 and the sixth point of time t6. If the time values does not differ more than a certain extent it is determined that the values are reliable.

Hereby a time interval topen between said first and said second point of time and another time interval tclose between said third and fourth point of time may be determined.

Figure 4A:
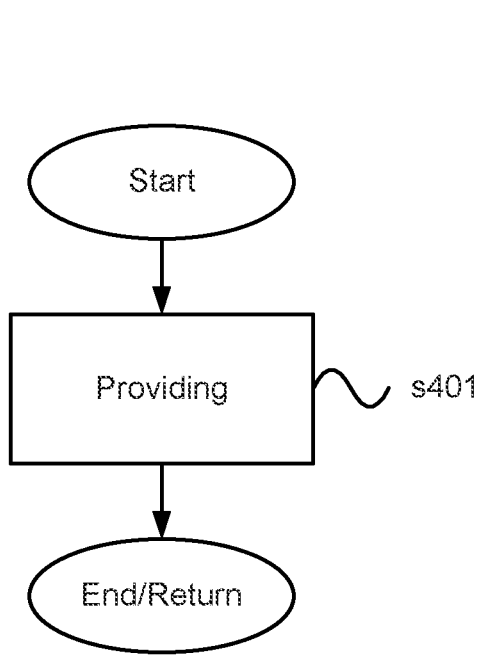
FIG. 4a is a schematic flowchart of a method according to an embodiment of the invention.

FIG. 4*a* schematically illustrates a flow chart of a method for adapting control of a reducing agent dosing unit 237 in a reducing agent provision system for emission control of a combustion engine 231, said reducing agent provision system comprising a pump unit 230 for pressurizing said reducing agent to be dosed, wherein said dosing unit 237 comprises an electrically controlled valve unit 291 arranged to be shifted between an opened state OS and a closed state CS.

The method comprises a first method step s401. The method step s401 comprises the steps of:

continuously determining a prevailing pressure P of said reducing agent in said reducing agent provision system downstream of said pump unit 230;

initiate shifting said valve unit 291 at a first point of time t1 to said open state OS from said closed state CS by applying a voltage V to a valve unit operation arrangement;

determining a second point of time t2 for a characteristic pressure drop due to said shifting to said open state OS of said valve unit 291;

initiate shifting said valve unit 291 at a third point of time t3 to said closed state CS from said open state OS by turning off said voltage V to said valve unit operation arrangement;

determining a fourth point of time t4 for a characteristic pressure increase due to said shifting to said closed state CS of said valve unit 291;

determining a time interval topen between said first and said second point of time and another time interval tclose between said third and fourth point of time; and providing the thus determined time intervals topen and tclose as a basis for said adaption control of said reduction agent dosing unit 237 for obtaining an intended dosing period during a dosing cycle.

After the method step s401 the method ends/is returned.

Figure 4B:
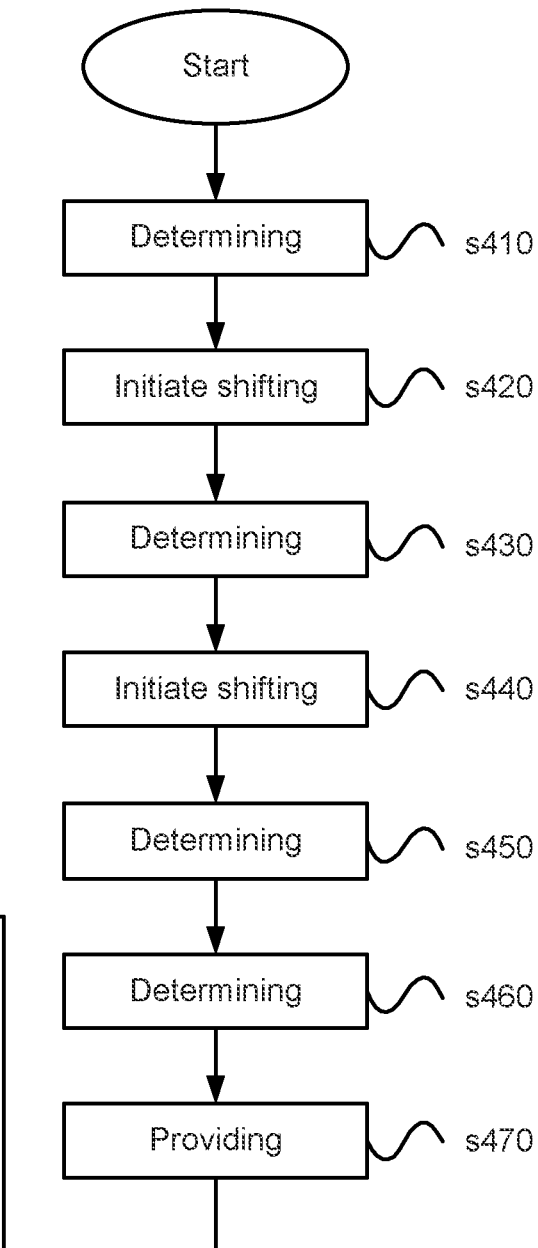
FIG. 4b is a schematic function diagram of a method according to an embodiment of the invention.
Figure 4B:
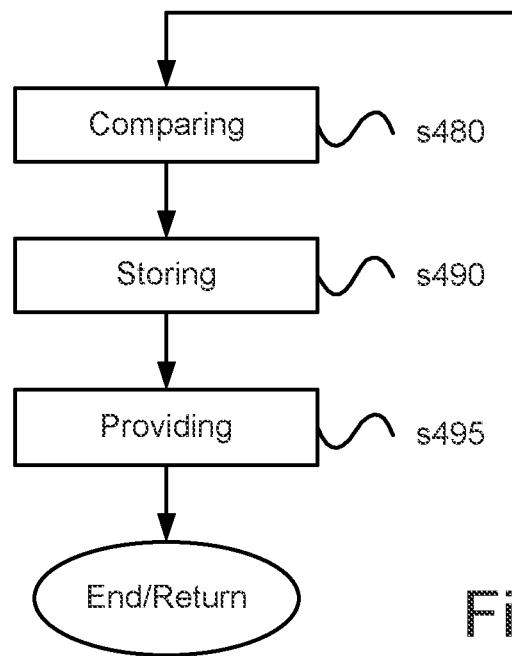

FIG. 4b schematically illustrates a method for adapting control of a reducing agent dosing unit 237 in a reducing agent provision system for emission control of a combustion engine 231, said reducing agent provision system comprising a pump unit 230 for pressurizing said reducing agent to be dosed, wherein said dosing unit 237 comprising an electrically controlled valve unit 291 arranged to be shifted between an opened state OS and a closed state CS.

The method comprises a first method step s410. The method step s410 comprises the step of continuously determining a prevailing pressure P of said reducing agent in said reducing agent provision system downstream of said pump unit 230. This is performed by means of said pressure sensor 239 and said first control unit 200. After the method step s410 a subsequent method step s420 is performed.

The method step s420 comprises the step of initiating shifting of said valve unit 291 at a first point of time t1 to said open state OS from said closed state CS by applying a voltage V to a valve unit operation arrangement 291, 292. This is performed by means of the first control unit. After the method step s420 a subsequent method step s430 is performed.

The method step s430 comprises the step of determining a second point of time t2 for a characteristic pressure drop due to said shifting to said open state of said valve unit 291. This is depicted also with reference to FIG. 3. This is performed by means of said first control unit 200. After the method step s430 a subsequent method step s440 is performed.

The method step s440 comprises the step of initiating shifting of said valve unit at a third point of time t3 to said closed state CS from said open state OS by turning off said voltage V to said valve unit operation arrangement 291, 292. After the method step s440 a subsequent step s450 is performed.

The step s450 comprises the step of determining a fourth point of time t4 for a characteristic pressure increase due to said shifting to said closed state CS of said valve unit 291. This is performed by means of said first control unit 200. After the method step s450 a subsequent step s460 is performed.

The step s460 comprises the step of determining a time interval topen between said first point of time t1 and said second point of time t2 and another time interval tclose between said third point of time t3 and said fourth point of time t4. This is performed by means of said first control unit 200. After the method step s460 a subsequent step s470 is performed.

The step s470 comprises the step of providing the thus determined time intervals topen, tclose as a basis for said adaption control of said reduction agent dosing unit 237 for obtaining an intended dosing period during a dosing cycle. After the method step s470 a subsequent step s480 is performed.

The step s480 comprises the step of continuously determining a prevailing current I applied for said valve unit operation arrangement 291, 292. The step s480 comprises the step of determining a fifth point of time t5 for a characteristic current drop due to said shifting to said open state OS of said valve unit 291. The step s480 comprises the step of comparing the thus determined second point of time t2 with said thus determined fifth point of time t5 to decide whether said second point of time t2 appears reliable. If there is a relatively small difference between the thus determined second point of time t2 and said thus determined fifth point of time t5 it is determined that said second point of time t2 is reliable. Said threshold difference may be a predetermined value. This is performed by means of said first control unit 200.

The step s480 comprises the steps of continuously determining a prevailing current I applied for said valve unit operation arrangement;

determining a sixth point of time t6 for a characteristic current increase due to said shifting to said closed state of said valve unit; and comparing the thus determined fourth point of time t4 with said thus determined sixth point of time t6 to decide whether said fourth point of time t4 appears reliable.

If there is a relatively small difference between the thus determined fourth point of time t4 and said thus determined sixth point of time t6 it is determined that said fourth point of time t4 is reliable. Said threshold difference may be a predetermined value. This is performed by means of said first control unit 200.

After the method step s480 a subsequent step s490 is performed

The step s490 comprises the step of storing said time intervals (topen, tclose) together with values for prevailing applied voltage V, prevailing reducing agent temperature Temp and prevailing pressure P of said reducing agent, said values corresponding to a particular system working point. This is performed by means of said first control unit 200.

The step s490 comprises the step of for a number of different system working points, storing corresponding determined pairs of time intervals (topen, tclose). This is performed by means of said first control unit 200.

After the method step s490 a subsequent step s495 is performed

The step s495 comprises the step of providing the thus stored system working point information for adapting control of said reduction agent dosing unit 200. This is performed by means of said first control unit 200.

The step s495 may alternatively comprise the step of providing non pre-stored determined time intervals (topen, tclose) as a basis for consecutive adaption control of said reduction agent dosing unit for obtaining an intended dosing period during a dosing cycle.

After the step s495 the method is ended/returned.

Figure 5:
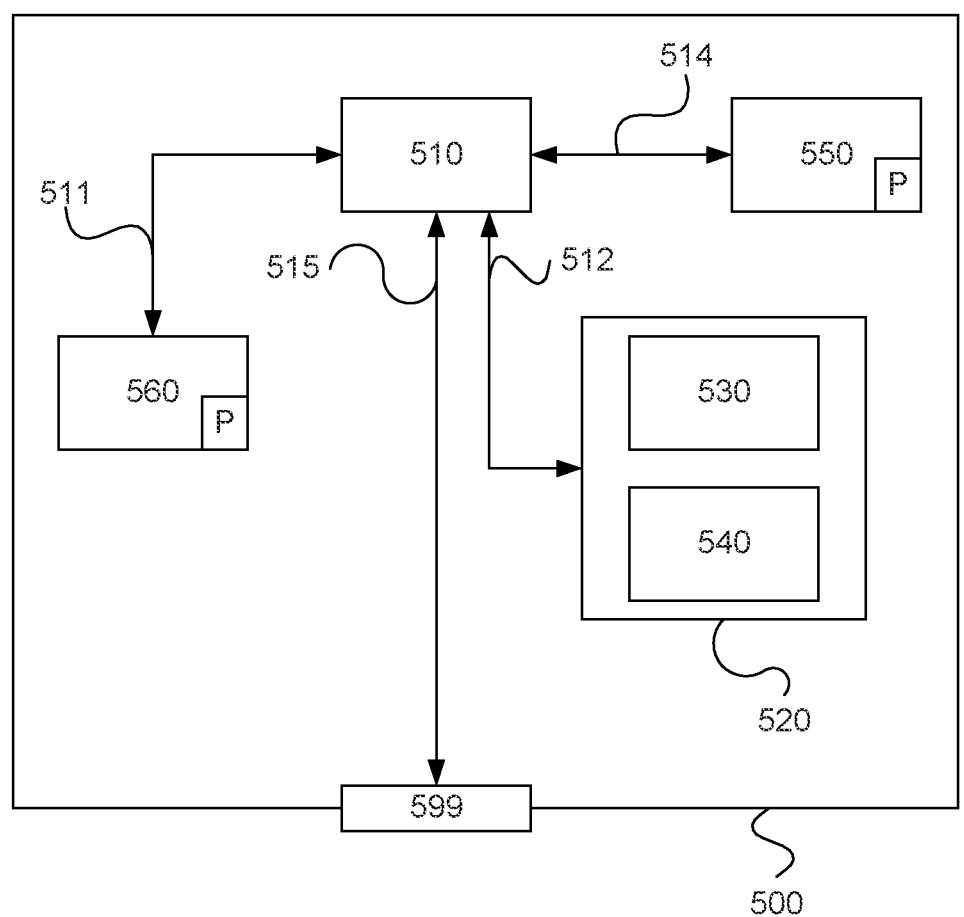
FIG. 5 schematically illustrates a computer according to an embodiment of the invention.

FIG. 5 is a diagram of one version of a device 500. The control units 200 and 210 described with reference to FIG. 2 may in one version comprise the device 500. The device 500 comprises a non-volatile memory 520, a data processing unit 510 and a read/write memory 550. The non-volatile memory 520 has a first memory element 530 in which a computer program, e.g. an operating system, is stored for controlling the function of the device 500. The device 500 further comprises a bus controller, a serial communication port, I/O means, an A/D converter, a time and date input and transfer unit, an event counter and an interruption controller (not depicted). The non-volatile memory 520 has also a second memory element 540.

The computer program P comprises routines for adapting control of a reducing agent dosing unit 237 in a reducing agent provision system for emission control of a combustion engine 231, said reducing agent provision system comprising a pump unit 230 for pressurizing said reducing agent to be dosed, wherein said dosing unit 237 comprising an electrically controlled valve unit 291 arranged to be shifted between an opened state OS and a closed state CS.

The computer program P may comprise routines for continuously determining a prevailing pressure P of said reducing agent in said reducing agent provision system downstream of said pump unit 230.

The computer program P may comprise routines for initiating shifting said valve unit 291 at a first point of time t1 to said open state OS from said closed state CS by applying a voltage V to a valve unit operation arrangement.

The computer program P may comprise routines for determining a second point of time t2 for a characteristic pressure drop due to said shifting to said open state OS of said valve unit 291.

The computer program P may comprise routines for initiating shifting said valve unit 291 at a third point of time t3 to said closed state CS from said open state OS by turning off said voltage V to said valve unit operation arrangement.

The computer program P may comprise routines for determining a fourth point of time t4 for a characteristic pressure increase due to said shifting to said closed state CS of said valve unit 291.

The computer program P may comprise routines for determining a time interval topen between said first and said second point of time and another time interval tclose between said third and fourth point of time.

The computer program P may comprise routines for providing the thus determined time intervals (topen, tclose) as a basis for said adaption control of said reduction agent dosing unit 237 for obtaining an intended dosing period during a dosing cycle.

The computer program P may comprise routines for continuously determining a prevailing current I applied for said valve unit operation arrangement.

The computer program P may comprise routines for determining a fifth point of time t5 for a characteristic current drop due to said shifting to said open state OS of said valve unit 291.

The computer program P may comprise routines for comparing the thus determined second point of time t2 with said thus determined fifth point of time t5 to decide whether said second point of time t2 appears reliable.

The computer program P may comprise routines for continuously determining a prevailing current I applied for said valve unit operation arrangement.

The computer program P may comprise routines for determining a sixth point of time t6 for a characteristic current increase due to said shifting to said closed state CS of said valve unit 291.

The computer program P may comprise routines for comparing the thus determined fourth point of time t4 with said thus determined sixth point of time t6 to decide whether said fourth point of time t4 appears reliable.

The computer program P may comprise routines for storing said time intervals (topen, tclose) together with values for prevailing applied voltage V, prevailing reducing agent temperature Temp and prevailing pressure P of said reducing agent, said values corresponding to a particular system working point.

The computer program P may comprise routines for, for a number of different system working points, storing corresponding determined pairs of time intervals (topen, tclose).

The computer program P may comprise routines for providing the thus stored system working point information for adapting control of said reduction agent dosing unit 237.

The computer program P may comprise routines for providing non pre-stored determined time intervals (topen, tclose) as a basis for consecutive adaption control of said reduction agent dosing unit 237 for obtaining an intended dosing period during a dosing cycle.

The computer program P may comprise routines for performing any of the process steps detailed with reference to FIG. 4b.

The program P may be stored in an executable form or in compressed form in a memory 560 and/or in a read/write memory 550.

Where it is stated that the data processing unit 510 performs a certain function, it means that it conducts a certain part of the program which is stored in the memory 560 or a certain part of the program which is stored in the read/write memory 550.

The data processing device 510 can communicate with a data port 599 via a data bus 515. The non-volatile memory 520 is intended for communication with the data processing unit 510 via a data bus 512. The separate memory 560 is intended to communicate with the data processing unit via a data bus 511. The read/write memory 550 is arranged to communicate with the data processing unit 510 via a data bus 514. The links L210, L230, L231, L233, L237, and L239, for example, may be connected to the data port 599 (see FIGS. 2a, 2b and 2c).

When data are received on the data port 599, they are stored temporarily in the second memory element 540. When input data received have been temporarily stored, the data processing unit 510 will be prepared to conduct code execution as described above.

Parts of the methods herein described may be conducted by the device 500 by means of the data processing unit 510 which runs the program stored in the memory 560 or the read/write memory 550. When the device 500 runs the program, method steps and process steps herein described are executed.

The foregoing description of the preferred embodiments of the present invention is provided for illustrative and descriptive purposes. It is not intended to be exhaustive, nor to limit the invention to the variants described. Many modifications and variations will obviously suggest themselves to one skilled in the art. The embodiments have been chosen and described in order to best explain the principles of the invention and their practical applications and thereby make it possible for one skilled in the art to understand the invention for different embodiments and with the various modifications appropriate to the intended use.

The components and features specified above may within the framework of the invention be combined between different embodiments specified.

The invention claimed is:

1. A method for adapting control of a reducing agent dosing unit in a reducing agent provision system for emission control of a combustion engine, said reducing agent provision system comprising a pump unit for pressurizing said reducing agent to be dosed, wherein said dosing unit comprising an electrically controlled valve unit arranged to be shifted between an opened state and a closed state, comprising the steps of:
continuously determining a prevailing pressure of said reducing agent in said reducing agent provision system downstream of said pump unit;
initiating shifting said valve unit at a first point of time to said open state from said closed state by applying a voltage to a valve unit operation arrangement;
determining a second point of time for a characteristic pressure drop due to said shifting to said open state of said valve unit;
initiating shifting said valve unit at a third point of time to said closed state from said open state by turning off said voltage to said valve unit operation arrangement;
determining a fourth point of time for a characteristic pressure increase due to said shifting to said closed state of said valve unit;
determining a time interval between said first and said second point of time and another time interval between said third and fourth point of time; and
providing the thus determined time intervals as a basis for said adaption control of said reduction agent dosing unit for obtaining an intended dosing period during a dosing cycle.

2. The method according to claim 1, comprising the steps of:
continuously determining a prevailing current applied for said valve unit operation arrangement;
determining a fifth point of time for a characteristic current drop due to said shifting to said open state of said valve unit; and
comparing the thus determined second point of time with said thus determined fifth point of time to decide whether said second point of time appears reliable.

3. The method according to claim 1, further comprising the steps of:
continuously determining a prevailing current applied for said valve unit operation arrangement;
determining a sixth point of time for a characteristic current increase due to said shifting to said closed state of said valve unit; and
comparing the thus determined fourth point of time with said thus determined sixth point of time to decide whether said fourth point of time appears reliable.

4. The method according to claim 1, further comprising the step of:
storing said time intervals together with values for prevailing applied voltage, prevailing reducing agent temperature and prevailing pressure of said reducing agent, said values corresponding to a particular system working point.

5. The method according to claim 4, further comprising the step of:
for a number of different system working points, storing corresponding determined pairs of time intervals.

6. The method according to claim 5, further comprising the step of:
providing the thus stored system working point information for adapting control of said reduction agent dosing unit.

7. The method according to claim 1, further comprising the step of:
providing non pre-stored determined time intervals as a basis for consecutive adaption control of said reduction agent dosing unit for obtaining an intended dosing period during a dosing cycle.

8. A system for adapting control of a reducing agent dosing unit in a reducing agent provision system for emission control of a combustion engine, said reducing agent provision system comprising a pump unit for pressurizing said reducing agent to be dosed, wherein said dosing unit comprising an electrically controlled valve unit arranged to be shifted between an opened state and a closed state, wherein said system comprises:
one or more control units; and
computer program code stored on a non-transitory computer-readable medium, said computer program code comprising computer instructions to cause the one or more control units to perform the following operations:
continuously determining a prevailing pressure of said reducing agent in said reducing agent provision system downstream of said pump unit;
initiating shifting said valve unit at a first point of time to said open state from said closed state by applying a voltage to a valve unit operation arrangement;
determining a second point of time for a characteristic pressure drop due to said shifting to said open state of said valve unit;
initiating shifting said valve unit at a third point of time to said closed state from said open state by turning off said voltage to said valve unit operation arrangement;
determining a fourth point of time for a characteristic pressure increase due to said shifting to said closed state of said valve unit;
determining a time interval between said first and said second point of time and another time interval between said third and fourth point of time; and
providing the thus determined time intervals as a basis for said adaption control of said reduction agent dosing unit for obtaining an intended dosing period during a dosing cycle.

9. The system according to claim 8, said computer program code further comprising computer instructions to cause the one or more control units to perform the following operations:
continuously determining a prevailing current applied for said valve unit operation arrangement;
determining a fifth point of time for a characteristic current drop due to said shifting to said open state of said valve unit; and
comparing the thus determined second point of time with said thus determined fifth point of time to decide whether said second point of time appears reliable.

10. The system according to claim 8, said computer program code further comprising computer instructions to cause the one or more control units to perform the following operations:
 continuously determining a prevailing current applied for said valve unit operation arrangement;
 determining a sixth point of time for a characteristic current increase due to said shifting to said closed state of said valve unit; and
 comparing the thus determined fourth point of time with said thus determined sixth point of time to decide whether said fourth point of time appears reliable.

11. The system according to claim 8, said computer program code further comprising computer instructions to cause the one or more control units to perform the following operations:
 storing said time intervals together with values for prevailing applied voltage, prevailing reducing agent temperature and prevailing pressure of said reducing agent, said values corresponding to a particular system working point.

12. The system according to claim 11, said computer program code further comprising computer instructions to cause the one or more control units to perform the following operations:
 for a number of different system working points, storing corresponding determined pairs of time intervals.

13. The system according to claim 12, said computer program code further comprising computer instructions to cause the one or more control units to perform the following operations:
 providing the thus stored system working point information for adapting control of said reduction agent dosing unit.

14. The system according to claim 8, said computer program code further comprising computer instructions to cause the one or more control units to perform the following operations:
 providing non pre-stored determined time intervals as a basis for consecutive adaption control of said reduction agent dosing unit for obtaining an intended dosing period during a dosing cycle.

15. A vehicle comprising a system for adapting control of a reducing agent dosing unit in a reducing agent provision system for emission control of a combustion engine, said reducing agent provision system comprising a pump unit for pressurizing said reducing agent to be dosed, wherein said dosing unit comprising an electrically controlled valve unit arranged to be shifted between an opened state and a closed state, wherein said system comprises:
 one or more control units; and
 computer program code stored on a non-transitory computer-readable medium, said computer program code comprising computer instructions to cause the one or more control units to perform the following operations:
  continuously determining a prevailing pressure of said reducing agent in said reducing agent provision system downstream of said pump unit;
  initiating shifting said valve unit at a first point of time to said open state from said closed state by applying a voltage to a valve unit operation arrangement;
  determining a second point of time for a characteristic pressure drop due to said shifting to said open state of said valve unit;
  initiating shifting said valve unit at a third point of time to said closed state from said open state by turning off said voltage to said valve unit operation arrangement;
  determining a fourth point of time for a characteristic pressure increase due to said shifting to said closed state of said valve unit;
  determining a time interval between said first and said second point of time and another time interval between said third and fourth point of time; and
  providing the thus determined time intervals as a basis for said adaption control of said reduction agent dosing unit for obtaining an intended dosing period during a dosing cycle.

16. The vehicle according to claim 15, which vehicle is any from among a truck, a bus or a passenger car.

17. A computer program product comprising computer program code stored on a non-transitory computer-readable medium, said computer program product used for adapting control of a reducing agent dosing unit in a reducing agent provision system for emission control of a combustion engine, said reducing agent provision system comprising a pump unit for pressurizing said reducing agent to be dosed, wherein said dosing unit comprising an electrically controlled valve unit arranged to be shifted between an opened state and a closed state, said computer program code comprising computer instructions to cause one or more control units to perform the following operations:
 continuously determining a prevailing pressure of said reducing agent in said reducing agent provision system downstream of said pump unit;
 initiating shifting said valve unit at a first point of time to said open state from said closed state by applying a voltage to a valve unit operation arrangement;
 determining a second point of time for a characteristic pressure drop due to said shifting to said open state of said valve unit;
 initiating shifting said valve unit at a third point of time to said closed state from said open state by turning off said voltage to said valve unit operation arrangement;
 determining a fourth point of time for a characteristic pressure increase due to said shifting to said closed state of said valve unit;
 determining a time interval between said first and said second point of time and another time interval between said third and fourth point of time; and
 providing the thus determined time intervals as a basis for said adaption control of said reduction agent dosing unit for obtaining an intended dosing period during a dosing cycle.

* * * * *